US007012519B2

(12) United States Patent
Lacy et al.

(10) Patent No.: US 7,012,519 B2
(45) Date of Patent: Mar. 14, 2006

(54) EMERGENCY SHUTOFF SYSTEM FOR POWER MACHINERY, WIRELESS MONITORING SYSTEMS, AND EMERGENCY SHUTOFF METHODS

(75) Inventors: Ted M. Lacy, Worley, ID (US); Randall Bolster, Spokane, WA (US); Britton M. Lacy, Worley, ID (US)

(73) Assignee: Red Fox & Company, LLC, Worley, ID (US)

( * ) Notice: Subject to any disclaimer, the term of this patent is extended or adjusted under 35 U.S.C. 154(b) by 159 days.

(21) Appl. No.: 10/789,828

(22) Filed: Feb. 27, 2004

(65) Prior Publication Data
US 2005/0190056 A1    Sep. 1, 2005

(51) Int. Cl.
*G08B 1/08*   (2006.01)
*H04Q 7/00*   (2006.01)

(52) U.S. Cl. .................................. 340/539.11; 340/679
(58) Field of Classification Search ........... 340/539.11, 340/425.5, 679, 684, 685; 74/2
See application file for complete search history.

(56) References Cited

U.S. PATENT DOCUMENTS

| | | | |
|---|---|---|---|
| 4,020,305 A | 4/1977 | Schwartz | 200/159 |
| 4,068,274 A | 1/1978 | Murphy, Jr. et al. | 361/23 |
| 4,686,380 A | 8/1987 | Angott | 307/125 |
| 4,959,647 A | 9/1990 | Daigle | 340/825.72 |
| 4,973,944 A * | 11/1990 | Maletta | 340/568.1 |
| 5,025,175 A * | 6/1991 | Dubois, III | 307/326 |
| 5,201,684 A | 4/1993 | DeBois, III | 452/127 |
| 5,263,824 A | 11/1993 | Waldbeser et al. | 417/10 |
| 5,400,924 A | 3/1995 | Brodie | 222/108 |
| 5,515,043 A | 5/1996 | Berard et al. | 340/988 |
| 5,572,204 A | 11/1996 | Timm et al. | 340/988 |
| 5,669,809 A | 9/1997 | Townsend | 452/125 |
| 5,838,227 A | 11/1998 | Murray | 340/425.5 |
| 6,124,791 A * | 9/2000 | Wolf | 340/539.1 |
| 6,160,323 A * | 12/2000 | Mayr et al. | 307/116 |
| 6,539,301 B1 | 3/2003 | Shirk et al. | 701/200 |
| 6,753,776 B1 * | 6/2004 | Drinkard | 340/540 |
| 6,897,783 B1 * | 5/2005 | Zeng et al. | 340/635 |

* cited by examiner

*Primary Examiner*—John Tweel, Jr.
(74) *Attorney, Agent, or Firm*—Wells St. John P.S.

(57) ABSTRACT

An emergency shutoff system for power machinery includes a control device housing a transmitter circuit, a receiver circuit, and a processor. A wireless device is carried by a user and configured to transmit information to the control device to cause the processor to shut down operation of the power machinery. The control device is configured to transmit a distress signal to a third party located remote from the power machinery, and provide an indication to attract attention of others. Transmission of the distress signal is initiated after receiving the control signals to shut down the power machinery. Selective operation of a single emergency switch provided on the wireless device is configured to cause the control device to operate in a plurality of different modes including disabling operation of the power machinery and preventing a third party from inadvertently initiating operation of the power machinery from a remote location.

47 Claims, 14 Drawing Sheets

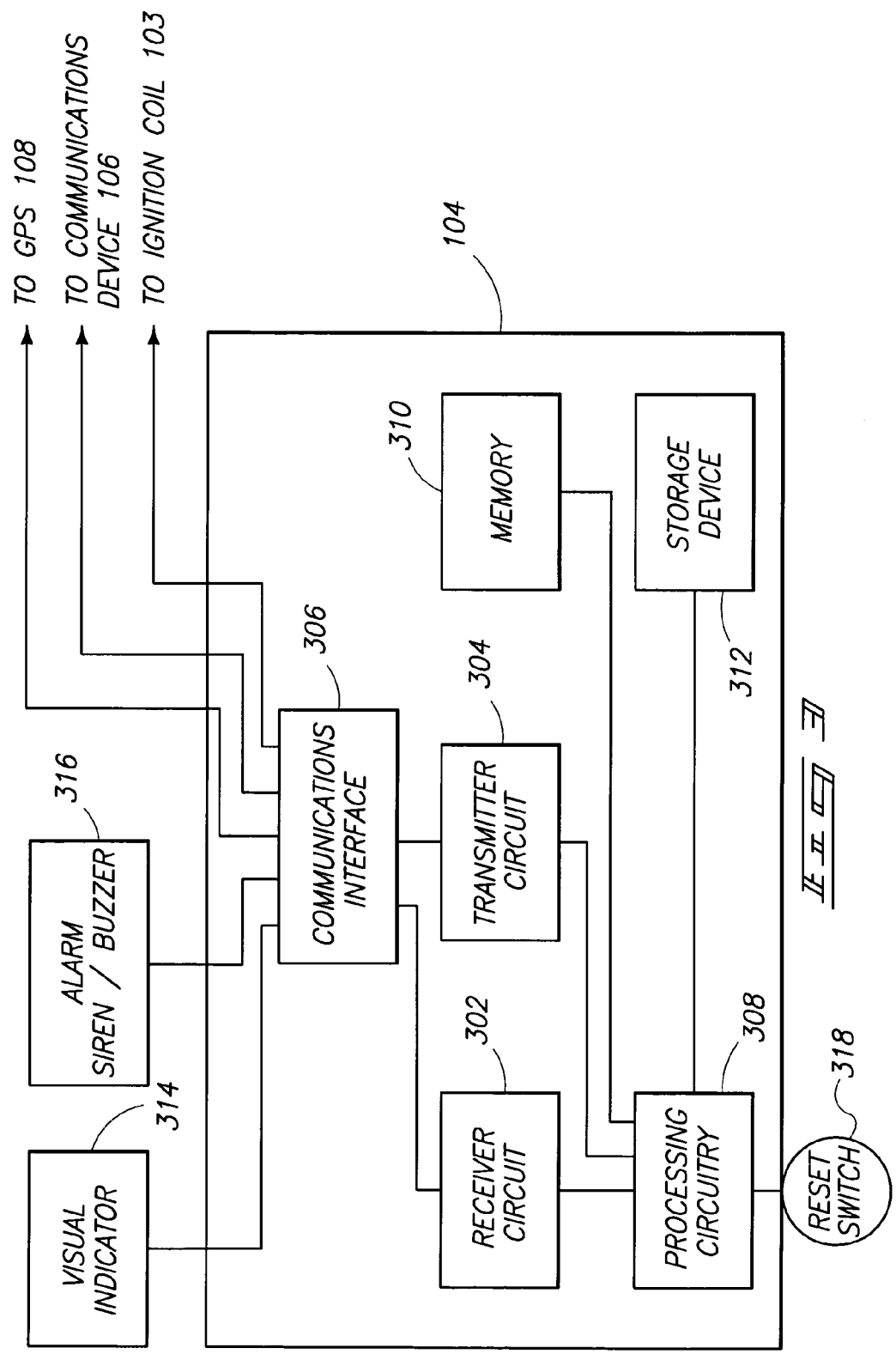

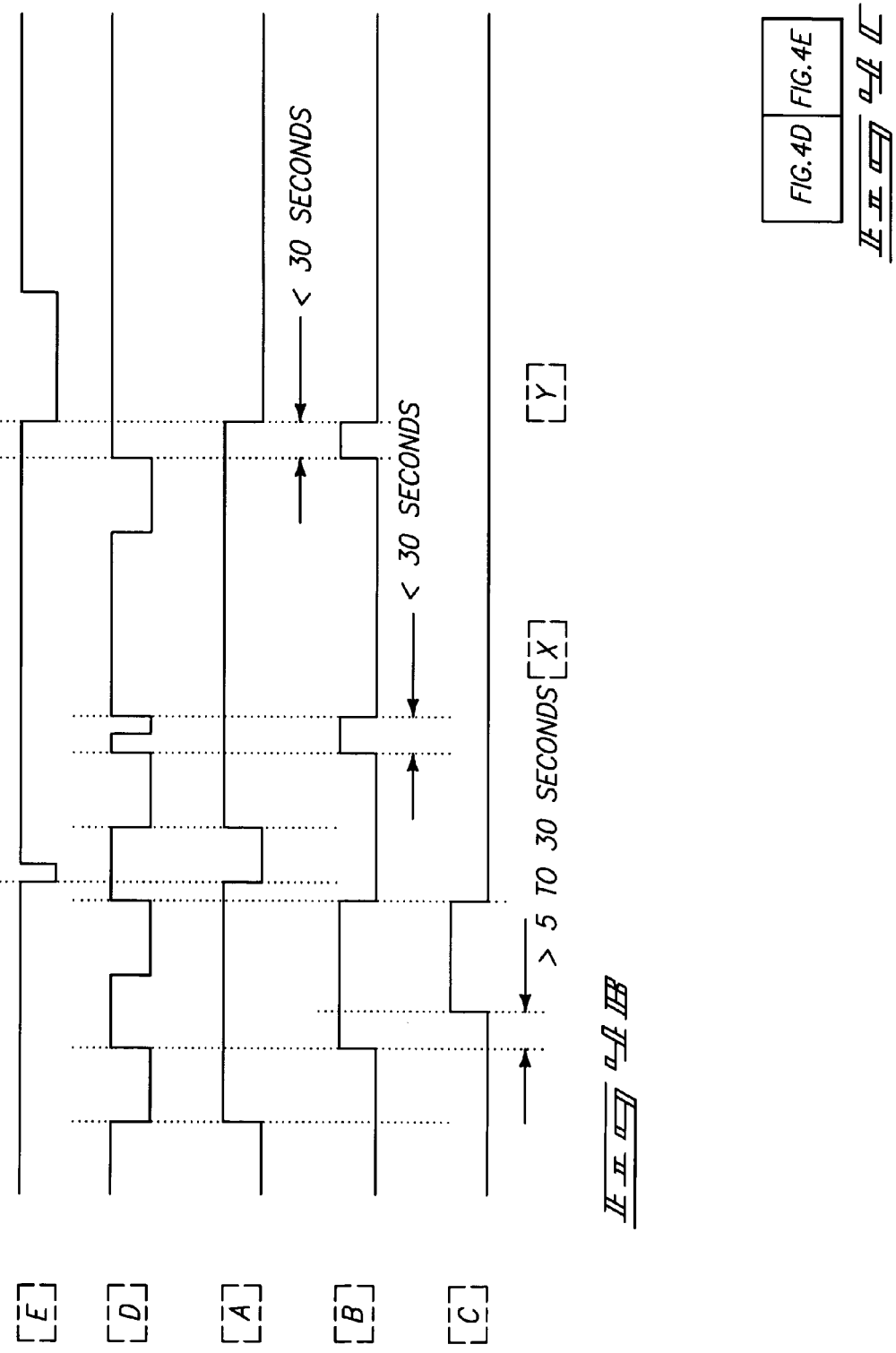

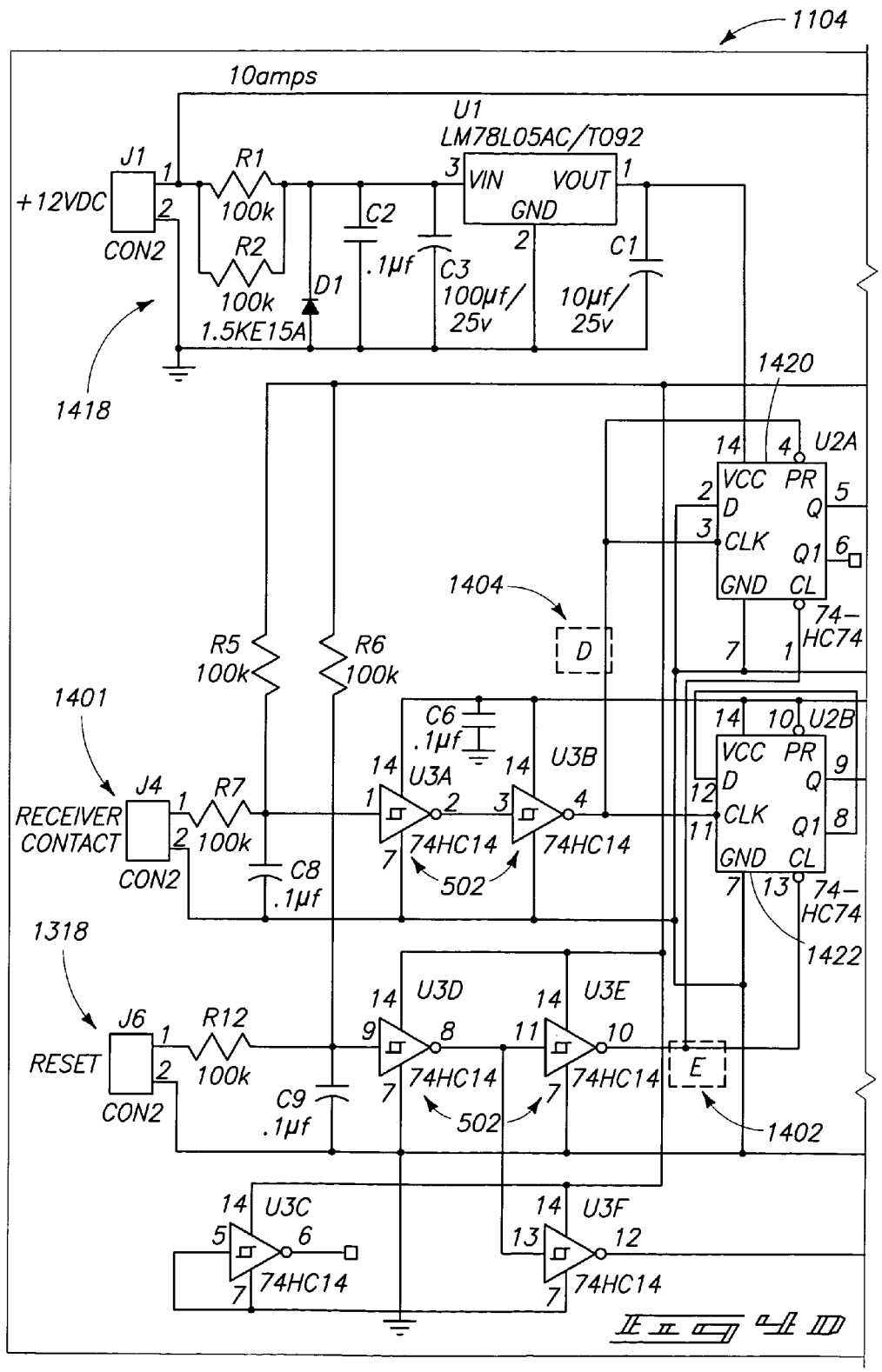

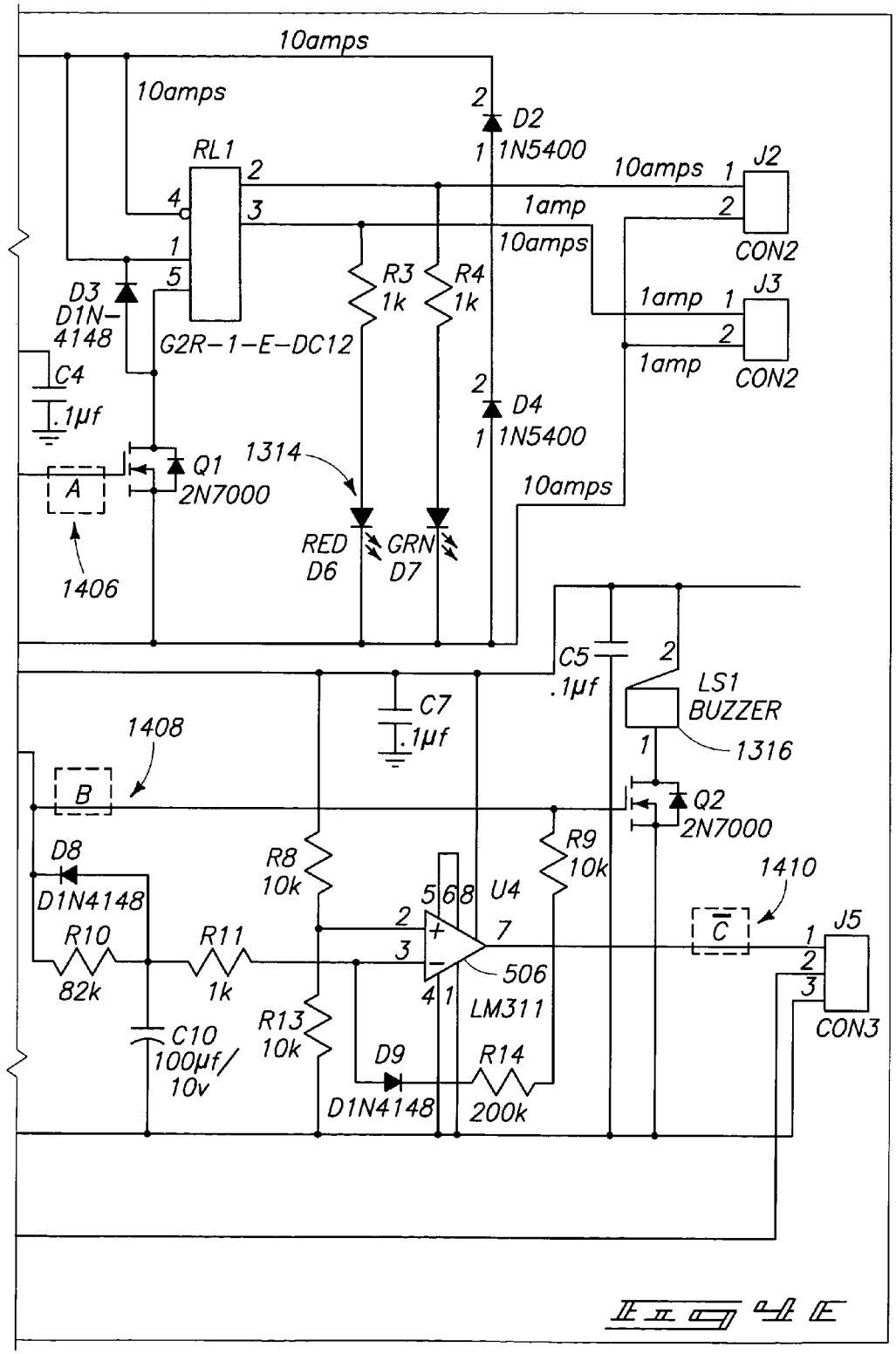

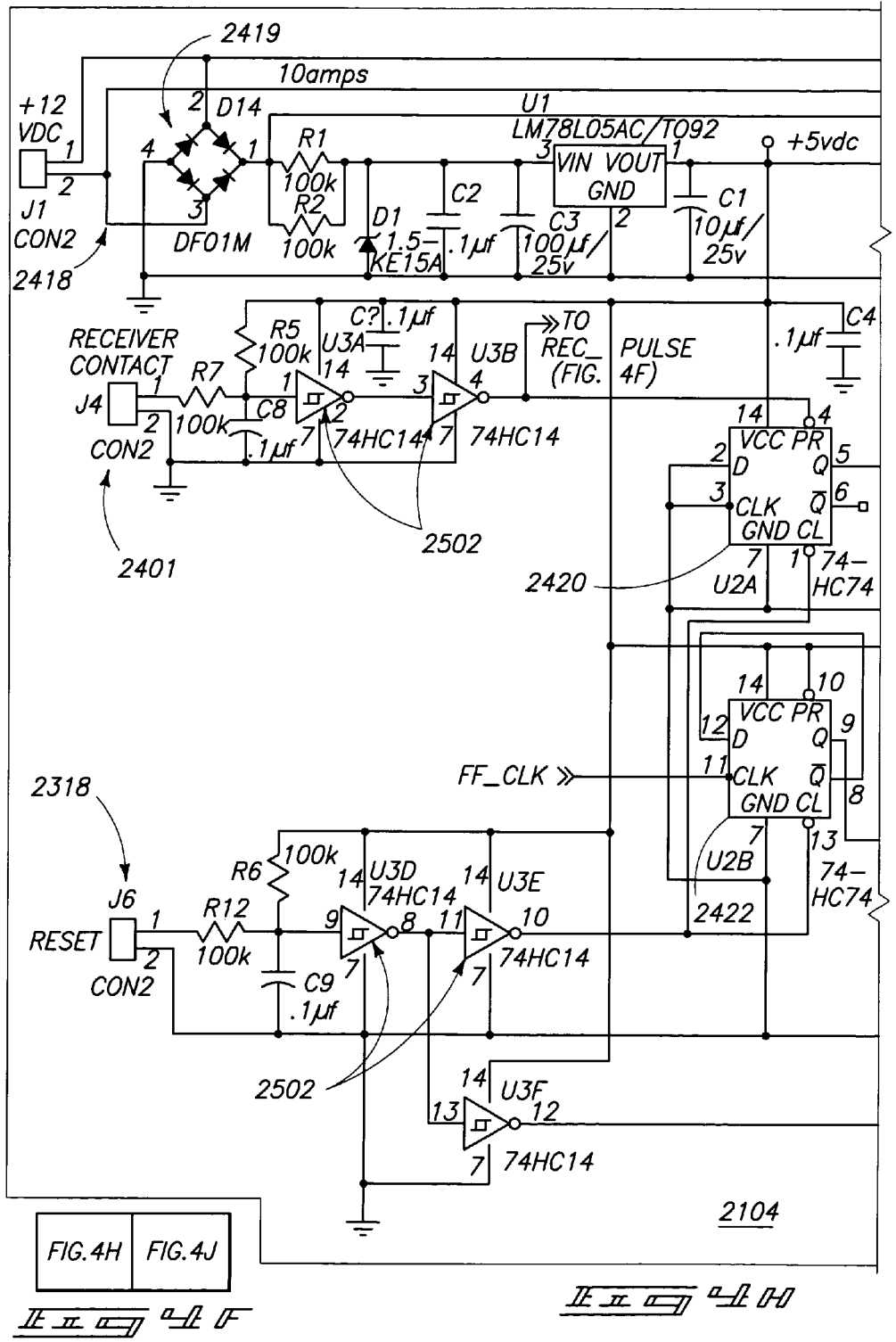

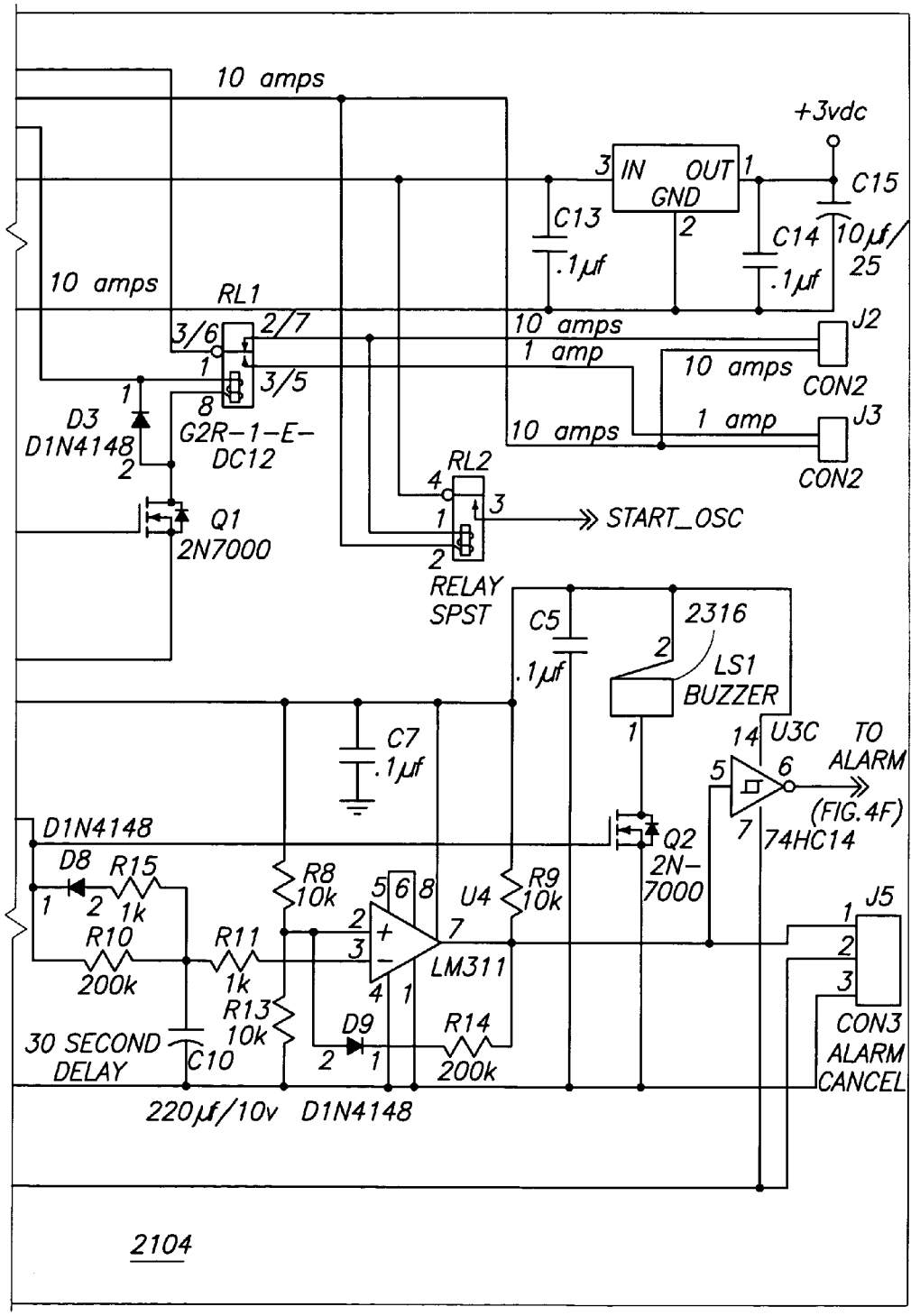

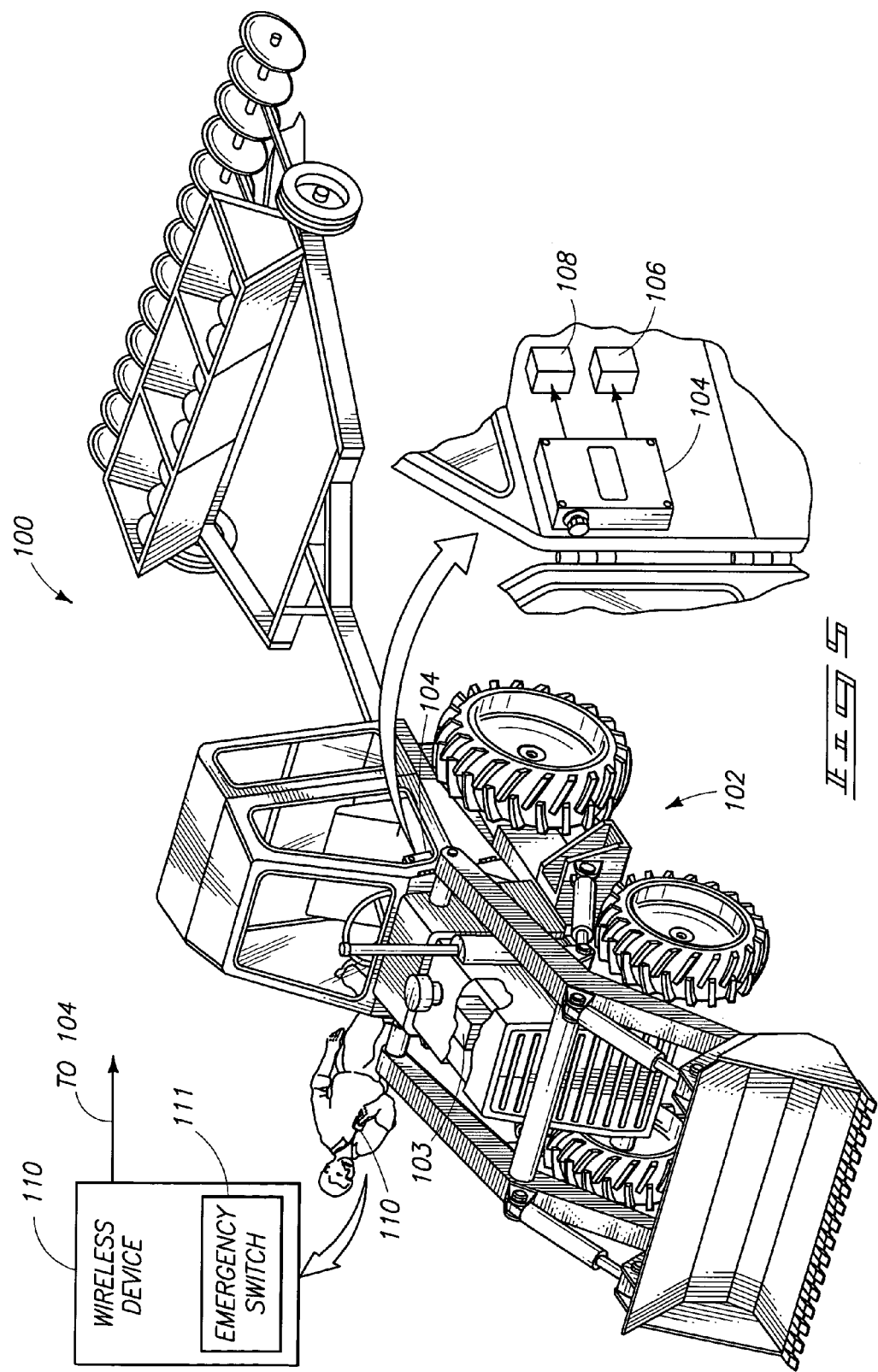

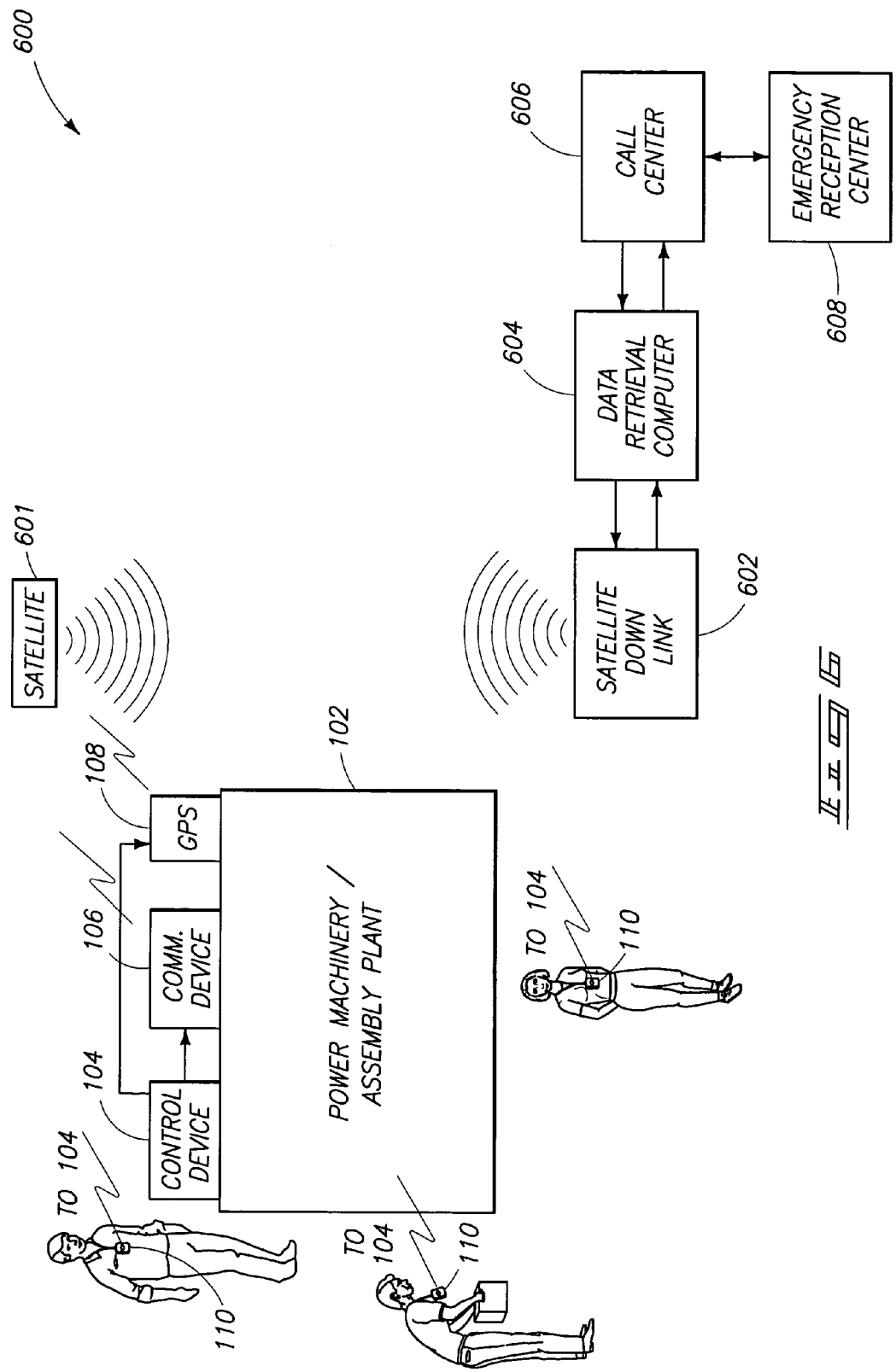

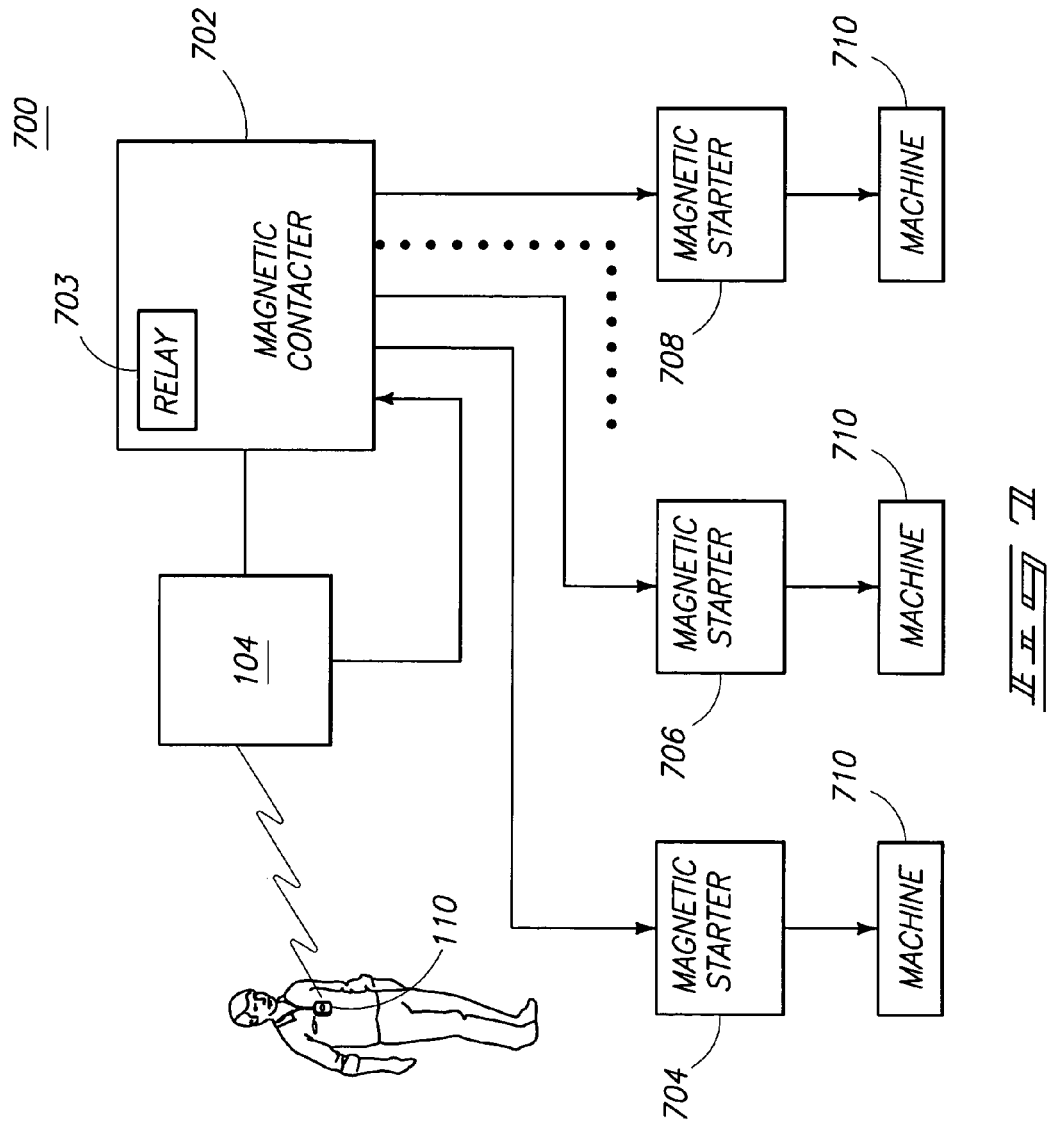

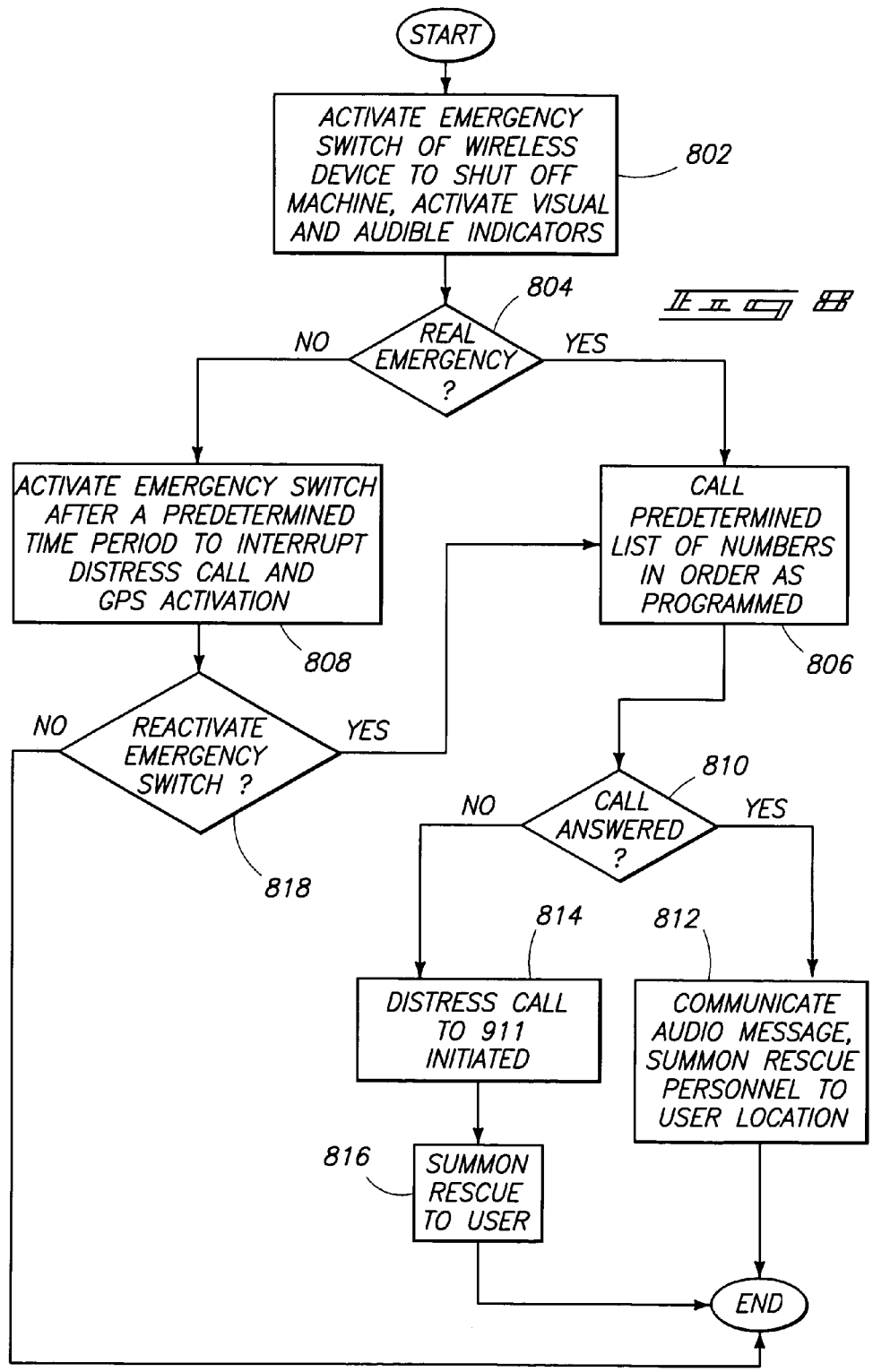

EMERGENCY SHUTOFF SYSTEM FOR POWER MACHINERY, WIRELESS MONITORING SYSTEMS, AND EMERGENCY SHUTOFF METHODS

TECHNICAL FIELD

The present invention pertains to a wireless system for controlling machinery. More particularly, aspects of the invention relate to a wireless user monitoring system for controlling processing machinery, locating a user and contacting emergency personnel. Methods of controlling processing machinery are also described.

BACKGROUND OF THE INVENTION

During the past few decades, the agricultural industry underwent many changes ranging from the increased use of technology to boost production to the slow, but constant erosion of the family farm not only in the United States, but in other countries as well. To date, agriculture remains one of the most hazardous industries in the United States and other countries. The occupational environment for this industry continues to present a wide variety of hazards to workers, including chemical exposures, noise, organic dusts, psychological stresses, and physical and mechanical exposures that may result in traumatic injury.

Traumatic injury and death arise from interaction with machinery used in farms, product assembly plants, or the like where heavy equipment is involved to perform the various tasks. For example, one of the major identifiable sources of traumatic injuries in the area of agriculture is due to power take off (PTO) and attachments to tractors, followed by other machinery such as harvesting machines. Countless numbers of traumatic injuries were reported in other areas such as assembly plants. For example, heavy machinery operators are exposed to the risks associated with moving machinery, and machinery having moving parts.

Further, old and unsafe machinery and equipment cause unnecessary injuries and death. Machines that have been improved over the years are usually safer to operate than older equipment. Agricultural areas often lack emergency treatment facilities and skilled personnel to attend to such injuries. Injury reducing design technologies are often available, but are not widely used because of a lack of hazard recognition and also because of enormous costs involved to prevent such injuries. Most of the agricultural workers are out in the field and installation of sophisticated surveillance and injury prevention equipment such as those used in huge assembly plants is impractical.

Various approaches to prevent traumatic injuries in an assembly or manufacturing plant, such as, for example, an automobile assembly plant, include installation of sophisticated equipment by custom designing such equipment which may cost upwards of hundreds of thousands or even millions of dollars. However, such costly and sophisticated surveillance and injury prevention systems may be afforded only by companies having such large sums of money to invest. Such sophisticated and expensive systems are beyond the reach of a small business owner or manufacturer, especially agricultural workers operating tractors, harvesting machines, and such, and also owners of small mechanical assembly plants that supply small parts to multinational companies.

Thus, there is a need for a cost effective, yet practical solution to overcome the traumatic injuries and deaths of workers operating various kinds of machinery.

SUMMARY OF THE INVENTION

Aspects of the invention relate to a wireless user monitoring system for controlling processing machinery, locating a user and contacting emergency personnel. Methods of controlling processing machinery are also described.

According to one aspect, an emergency shutoff system for power machinery includes a control device housing a transmitter circuit, a receiver circuit, and a processor. The control device is configured to be detachably mounted to the power machinery to control an operation thereof. The system also includes a wireless device carried by a user and configured to transmit information to the control device, the information including control signals to cause the processor to shut down operation of the power machinery. The control device is configured to transmit a distress signal to a third party located remote from the power machinery, and provide an indication to attract attention of others. Transmission of the distress signal is initiated after receiving the control signals to shut down the power machinery. A communications device communicatively coupled to the control device is provided to transmit the distress signal to the third party. The control device is configured to operate in a plurality of different modes, individual ones of the plurality of different modes being configured to perform a distinct function, and wherein selective operation of a single emergency switch provided on the wireless device is configured to cause the control device to operate in the plurality of different modes including disabling operation of the power machinery and preventing a third party from inadvertently initiating operation of the power machinery from a remote location, the disabling of the power machinery triggers the communications device to transmit the distress signal to the third party.

According to another aspect, an emergency shutoff system for an assembly plant includes a control device configured to be detachably mounted to the assembly plant to control an operation of the assembly plant, a plurality of wireless devices, individual ones of the wireless devices adapted to be carried by a user and configured to transmit control information to the control device to shut off operation of the assembly plant and selectively perform one or more functions including (i) transmitting a distress signal to a third party located remote from the assembly plant, the transmission of the distress signal being initiated after receiving the control information to shut off the assembly plant, (ii) provide an indication to attract attention of others. The emergency shutoff system also includes a communications device communicatively coupled to the control device to transmit the distress signal, and wherein the control device is configured to operate in a plurality of different modes, and wherein a single emergency switch provided on individual ones of the wireless devices is configured to enable the control device to be operated in the plurality of different modes including disabling operation of the assembly plant to prevent a third party from inadvertently initiating operation of the assembly plant from a remote location.

According to a further aspect, an emergency shutoff system for controlling a plurality of power machinery includes a power controller having a relay switch configured to operate in a first and second positions, the first position establishing contact with a power supply and the second position disabling the contact with the power supply, the power controller configured to supply power to the plurality of power machinery, a control device configured to be detachably mounted to the power controller, a wireless device carried by a user and configured to transmit control information to the control device to shut down operation of the plurality of power by causing the relay switch to move from the first position to the second position, the control device being configured to selectively perform one or more functions including (i) transmitting a distress signal to a third party, (ii) provide an indication to attract attention of others, a communications device communicatively coupled to the control device to transmit the distress signal, and wherein selective operation of a single emergency switch provided on the wireless device enables the control device to perform a plurality of external functions including preventing a third party from inadvertently initiating operation of the plurality of power machinery from a remote location.

According to yet another aspect, a system configured to perform emergency shut down of an agricultural machine and contact rescue personnel, the system includes a control device housing a transmitter circuit, a receiver circuit, and a processor, the control device configured to be detachably mounted to the agricultural machine to shut off operation of the machine. The control device includes a processor, a communications interface configured to communicate with external devices, a memory configured to store user programmed information, and a storage device configured to store user related information including a predetermined list of telephone numbers to which distress calls are selectively initiated by the user, and a plurality of sets of audio recorded information. The system also includes a visual and audible device provided on the agricultural machine and communicatively coupled to the control device, the control device configured to initiate operation of the visual and audible devices, a wireless remote controller carried by a user and configured to transmit control signals to the control device, the receiver circuit of the control device configured to receive the control signals, the control signals are provided to the processor to shut down operation of the agricultural machinery, the transmitter circuit of the control device is configured to transmit a distress signal to a third party located remote from the agricultural machinery while activating operation of the visual and audible devices, a communications device communicatively coupled to the control device to transmit the distress signal to the third party, and wherein the control device is configured to operate in a plurality of different modes, individual ones of the plurality of different modes being configured to perform a distinct function, and wherein a single switch provided on the wireless remote controller is configured to initiate the plurality of different modes of operation of the control device including an ability to disable operation of the agricultural machine and prevent a third party from inadvertently initiating operation of the agricultural machine from a remote location, and the wireless remote controller is configured to interrupt transmission of a previously initiated distress signal from the control device by pressing the single switch for a predetermined time period within a predetermined time period after transmitting the distress signal.

In yet another aspect, an emergency shutoff method for power machinery includes detachably mounting a control device to the power machinery to control the power machinery, the control device including a transmitter circuit, a receiver circuit, and a processor. The method also includes transmitting information from a wireless device, carried by a user, to the control device to cause the processor to shut off operation of the power machinery, after receiving an indication of the shutoff of the power machinery, transmitting a distress signal to a third party located remote from the power machinery, providing an indication to attract attention of others by activating visual and audible devices provided on the power machinery, and selectively operating an emergency switch provided on the wireless device to cause the control device to perform distinct function of a plurality of external functions including an ability to disable operation of the power machinery and prevent a third party from inadvertently initiating operation of the power machinery from a remote location.

BRIEF DESCRIPTION OF THE DRAWINGS

Preferred embodiments of the invention are described below with reference to the following accompanying drawings.

FIG. 3 is a block diagram schematic of a control device shown in FIG. 1 in accordance with various embodiments of the invention.

FIG. 4B is a timing diagram of the circuit schematic of the control device shown in FIG. 4A.

FIG. 4C–4E are an exemplary circuit schematic of the control device shown in FIG. 1 in accordance with another embodiment of the invention.

FIGS. 4F–4H and 4J show an exemplary circuit schematic of the control device shown in FIG. 1 in accordance with another embodiment of the invention.

FIG. 5 is a schematic illustrating activation of the emergency shutoff system by a user of a power machine during an emergency situation.

FIG. 6 is a high-level schematic of an emergency shutoff system in accordance with other embodiments of the invention.

FIG. 7 illustrates an emergency shutoff system in accordance with some other embodiments of the invention.

FIG. 8 is a flowchart describing a methodology of shutting down operation of a power machine using the control device and the wireless device according to some embodiments of the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

While the invention is described by way of various preferred embodiments, it is understood that the description is not intended to limit the invention to these embodiments, but is intended to cover alternatives, equivalents, and modifications which may be broader than these embodiments such as are defined within the scope of the appended claims.

Figure 1:
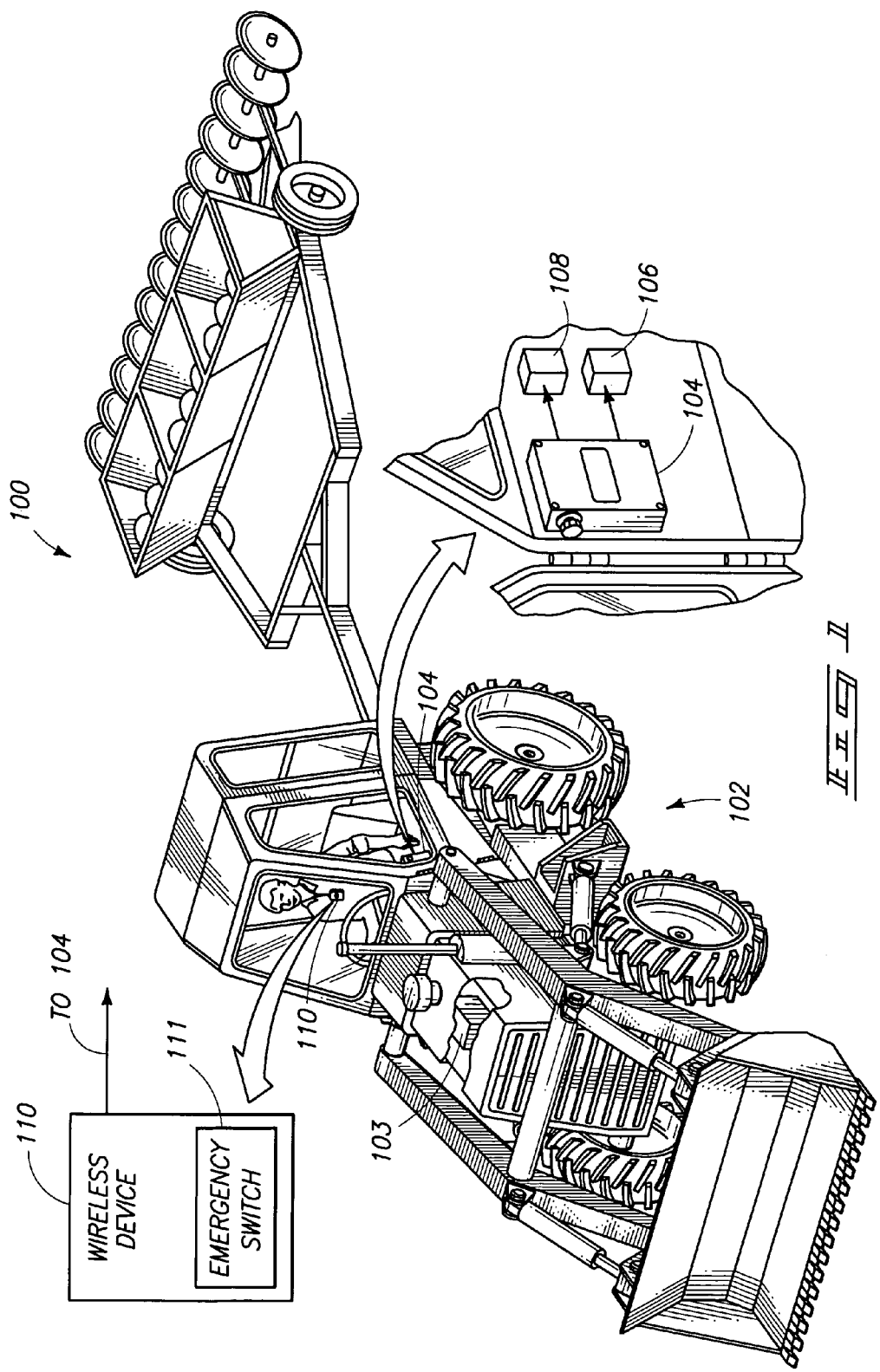
FIG. 1 is an exemplary schematic illustrating an emergency shutoff system configured to control operation of a power machine in accordance with various embodiments of the invention.

FIG. 1 is an exemplary schematic illustrating an emergency shutoff system 100 configured to control operation of a power machine 102 in accordance with various embodiments of the invention. In one example, the machine 102 may be a tractor or a similar mobile vehicle used in an agricultural environment. The power machine 102 may include an injector pump, or an ignition coil if the power machine is of the type that operates on electrical power. The ignition coil is also referred to herein as engine coil. The power machine 102 may include a power take off (PTO) point. The power take off may be used to provide power to equipment that is pulled by the power machine 102.

The system 100 includes a control device 104 (e.g., fox paws receiver), a communications device 106 (e.g., cellular, satellite, or landline communications device), a global positioning system (GPS) 108, and a wireless device (e.g., wireless controller) 110. The GPS 108 is a true GPS system, such as the one from Teletouch Communications, Inc, Texas. The control device 104 is configured to be detachably mounted to the machine 102. Operation of the machine 102 is controlled by disabling power supplied to the engine coil or injector pump 103. For example, the control device 104 may be connected to the engine coil 103 of the machine 102 such that control signals from a user of the wireless device 110 are provided to the control device 104 which in turn is configured to disable power supplied to the engine coil 103, thereby shutting off operation of the machine 102. Communication range between the wireless device 110 and the control device 104 is upto ¼ mile. Further details of the control device 104 are set forth at FIG. 3.

Figure 2:
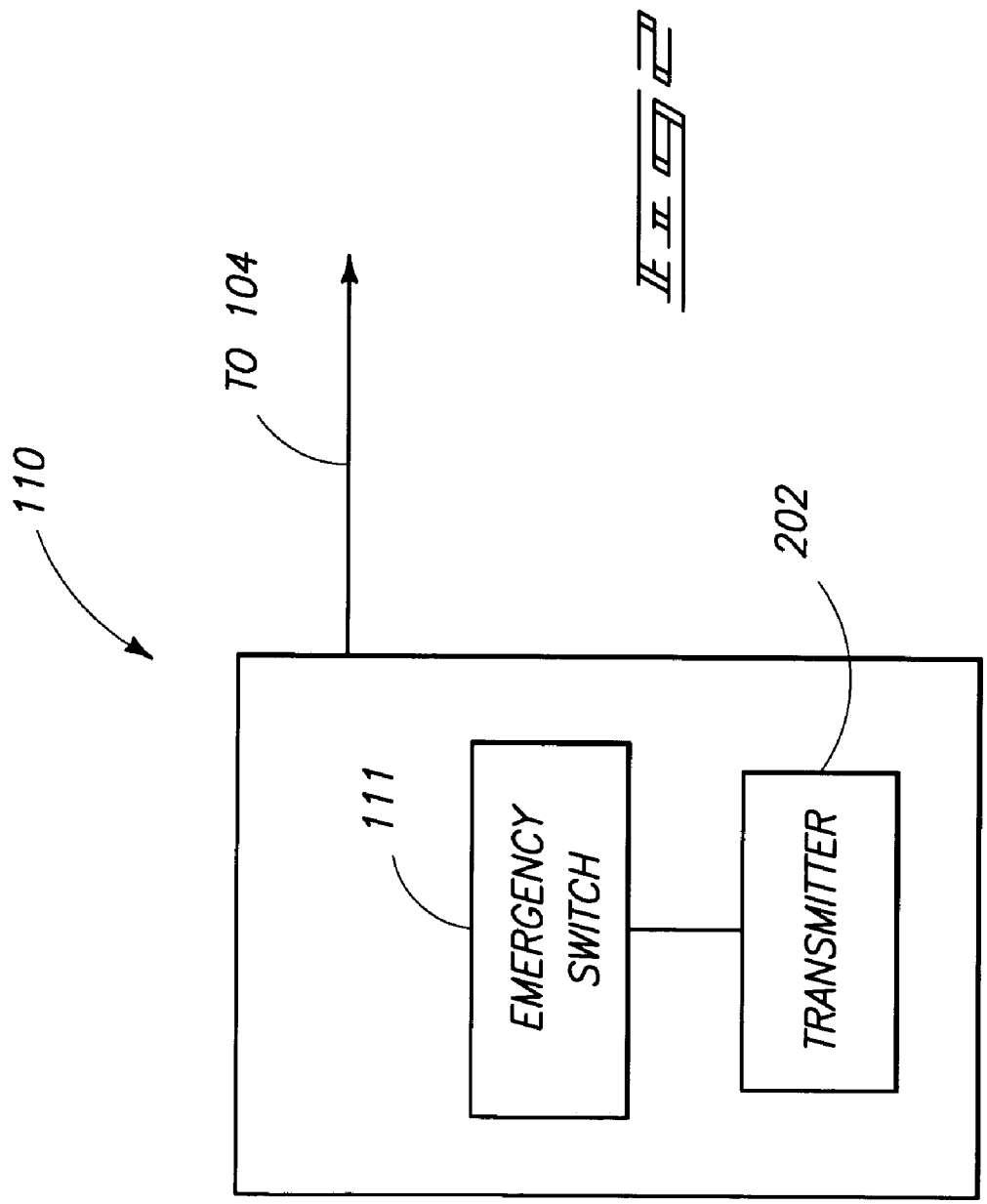
FIG. 2 is an exemplary schematic of a wireless device configured to be carried by a user of the power machine shown in FIG. 1.

FIG. 2 is an exemplary schematic of the wireless device (e.g., wireless controller) 110 configured to be carried by a user of the machine 102 as shown in FIG. 1 and in accordance with various embodiments of the invention. The wireless device 110 includes an emergency switch 111 and a transmitter 202. When the switch 111 is activated by the user in the event of an emergency, the transmitter 202 sends out a signal of a predetermined frequency to the control device 104 which in turn controls an operation of the machine 102.

Upon activating (e.g., pressing) the switch 111 once, the transmitter 202 sends out a signal to the control device 104, and the control device 104 causes the machine 102 to shut down by disabling the power supplied to the engine coil 103 of the machine 102. Visual and audible indicators provided on the machine 102 and communicatively coupled to the control device 104 are activated upon shutting down of the machine 102.

The wireless device 110 is configured to be carried by a user (e.g., on a user's person) during operation of the machine 102. The single switch 111 may be conveniently used by the user to perform a plurality of modes of operation (e.g., plurality of distinct external functions). The control device 104 is configured to operate in a predetermined mode among the plurality of modes after the emergency switch 111 is pressed by the user a predetermined number of times during a predetermined time period. For example, upon activating (e.g., pressing) the switch 111 a single time, the user may shutoff operation of the machine 102 while a distress call is simultaneously made via the communications device 106 to a third party requesting dispatch of rescue personnel. In some embodiments, the GPS 108 is also activated when the distress call is made in order to provide a geographic location of the user to the rescue personnel. However, if the user feels that he or she is not in imminent danger and that there is no need for the rescue personnel, the user may activate or press the switch 111 after a predetermined period of time and for a predetermined duration in order to disable transmission of the distress call from the communications device 106 to the third party while also disabling the previously activated GPS operation. Thus, by conveniently operating a single emergency switch 111, the user is enabled to initiate preprogrammed operations in order to control a plurality of external functions.

FIG. 3 is a block diagram schematic of a control device 104 in accordance with various embodiments of the invention. The control device 104 includes a receiver circuit 302, a transmitter circuit 304, processing circuitry 308, a memory 310, a storage device 312, a visual indicator device 314, and an audible indicator device 316. It will be appreciated that the memory 310 and the storage device 312 may be optionally included in the control device 104. In another embodiment, the memory 310 and the storage device 312 may be provided in the call center 606 (FIG. 6).

The receiver circuit 302 includes circuitry that is tuned to receive signals transmitted from the transmitter 202 of the wireless device 110.

The transmitter circuit 304 includes circuitry for transmitting signals from the control device 104 to the communications device 106 that is configured to send a distress signal to a third party. The transmitter circuit 304 is also configured to transmit signals to the GPS 108 that is configured to determine a geographic location of the machine 102 (FIG. 1).

The communications interface 306 is configured to communicate electronic data externally of the control device 104, for example, with respect to the communications device 106, the GPS 108, the engine coil 103, and the visual and audible indicators 314, 316, respectively. Interface 306 may comprise a parallel port, a serial port, USB port, EIO slot, network interface card, IEEE 1394 connector, wireless, and/or other appropriate configuration capable of communicating electronic data.

Processing circuitry 308 is configured to process data to invoke or control operations of the control device 104. In one embodiment, processing circuitry 308 may comprise circuitry configured to execute provided programming. In one example, processing circuitry 308 may be configured to execute instructions received from a user of the machine 102. The communications device 106 and the GPS 108 are configured to be automatically activated by the processing circuitry 308 if the user causes the power machine 102 (FIG. 1) to be shut down. The geographic location information determined by the GPS 108 may be used to identify a general location of the power machine 102. The audible and visual information may be used to pinpoint the location of the power machine once the general location is determined.

For example, if the user activates the emergency switch 111 of the wireless device 110 by pressing it once, then such a signal is received by the receiver 302 and is provided to the processing circuitry 308. Upon receiving such signal, the processing circuitry 308 provides a signal to disable power to the engine coil 103 or injector pump, thereby shutting off the machine 102 while simultaneously instructing the communications device 106 to transmit a distress call to a third party (e.g., rescue personnel). The functionality of control device 104, communications device 106, and GPS 108 may be distributed differently depending on the particular implementation.

Other exemplary operations of the processing circuitry 308 include instructing the GPS 108 to determine a geographic location of the machine 102 and provide such location information to a third party to whom the distress signal from the communications device 106 is transmitted. Upon user request, the processing circuitry 308 may be configured to instruct the communications device 106 to interrupt or request a cancellation of a previously initiated distress call to the third party and the activation of the GPS 108. For example, if the processing circuitry 308 receives another signal from the wireless device 110 (e.g., upon activation of the switch 111 by the user) within a predetermined time period and/or for a predetermined time period that is preprogrammed in the memory 310, then such a signal may be decoded by the processing circuitry 308 to mean that a previously initiated distress signal to the third party should be interrupted. Further, the processing circuitry 308 may be configured to instruct the communications device 106 to dial telephone numbers in a predetermined order from a predetermined list of telephone numbers stored in the memory 310 or the storage device 312.

Likewise, the processing circuitry is configured to retrieve pre-stored audio clips from the storage device 312 and transmit such audio clips via the communications device 106 to a third party. For example, if at least one of the parties from the list of telephone numbers can be reached, then a first audio clip may be transmitted to such party. In the event none of the parties from the list of telephone numbers can be reached, then a second audio clip may be transmitted to an emergency number (e.g., 911) seeking immediate dispatch of rescue personnel to the user's location. If the user is operating mobile machinery (e.g., a tractor in an agricultural farm), then the user's geographic location may be determined via the GPS 108. After the geographic location is obtained, a further precise location of the user may be determined by following the visual and audible indicators 314, 316 (FIG. 3), respectively.

The processing circuitry 308 may be implemented as a microprocessor or other structure configured to execute executable applications of programming including, for example, software and/or firmware instructions. Other exemplary embodiments of processing circuitry 308 include hardware logic, programmable gate array (PGA), field programmable gate array (FPGA), application specific integrated circuit (ASIC), or other structures. These examples of processing circuitry 308 are illustrative. Other configurations are possible for implementing operations discussed herein.

The memory 310 may be configured to store user specific information. For example, a user of the machine 102 may program the control device 104 to information that is specific to the user. Such information may include, for example, programming the control device 104 with a list of telephone numbers that the user wishes be contacted in the event the user encounters an emergency. The memory 310 may be configured to store electronic data, file systems having one or more electronic files and programming to perform executable instructions (e.g., software or firmware), or other digital information. The memory 310 may be configured as processor-usable media as defined below.

The storage device 312 is configured to store electronic data, a database with file systems having one or more electronic files, programming such as executable instructions (e.g., software and/or firmware), or other digital information and may include processor-usable media. Processor-usable media includes any article of manufacture that can contain, store, or maintain programming, data or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

As illustrated in the depicted example, the storage device 312 is configured to store information related to a user of the machine 102 (FIG. 1). Such information may be stored in the form of file systems having one or more electronic files. In one example, the storage device 312 may include a list of telephone numbers as determined by a user of the machine 102. Alternatively, such information may be stored in the memory 310. As noted above, the storage device 312 may also include audio clips.

The visual and audible indicators 314, 316, respectively, are provided to enable rescue personnel to more accurately pinpoint a location of the machine 102 in the event of an emergency to the user operating such machine. Exemplary visual indicators include strobe light, flashing light, etc. and exemplary audible indicators include such devices as a siren, etc. that are configured to immediately attract attention of rescue personnel. For example, during normal mode of operation, a green light of the visual indicator 314 may be turned ON, and in the event of an emergency, a flashing strobe light or a red light may be activated.

The control device 104 also includes a reset switch 318 that is of the safety type requiring a manual reset once actuated. For example, once emergency shutoff of the machine 102 is initiated by a user, switch 318 is caused to trip from a first state to a second state and requires a manual reset before the machine 102 may again be operated. Such a safety feature enables a third party from inadvertently starting operation of the machine 102 from a remote location.

Figure 4A:
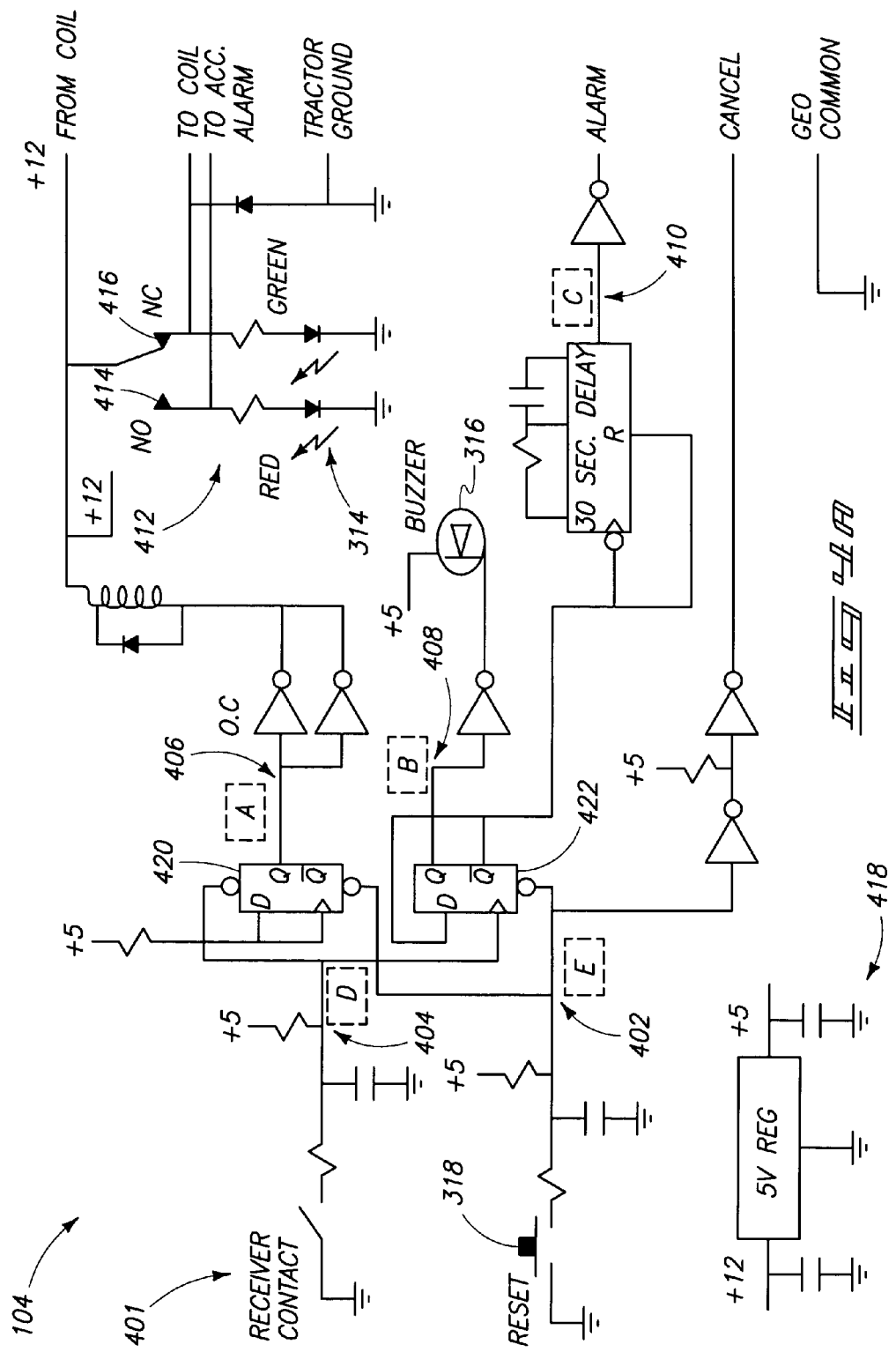
FIG. 4A is an exemplary circuit schematic of the control device shown in FIG. 1.

FIG. 4A is an exemplary circuit schematic of the control device 104 wherein reference numerals like those shown in FIG. 3 are shown using similar reference numerals. Whenever a user activates (e.g., depresses) the reset switch 318 (FIG. 3) of the control device 104, the reset signal "E" at a position 402 goes low. Such is also shown in the timing diagram of FIG. 4b. When the emergency switch 111 of the wireless device 110 (FIG. 1) is depressed by a user, receiver contact signal "D" of the control device goes low at a position shown by reference numeral 404. The receiver contact signal "D", resulting from depressing receiver contact 401, stays low as long as the emergency switch 111 is pressed by the user. The "low" state of the receiver contact signal "D" at the position 404 causes the signal "A" at a position 406 to move to a "high" state until the reset switch 318 is pressed. While the signal at "A" is high, relay 412 is in the normally open (NO) position 414, and the circuit to a coil (e.g., ignition coil 103) is disrupted and the engine (e.g., power machine 102) is stopped. The circuit schematic of the control device also includes a regulator circuit 418 configured to provide a step down voltage (e.g., from +12 V to +5 V). Such reduced voltage is provided to various components of the circuit including D-type flip flops 420, 422. The schematic of FIG. 4a also illustrates visual and audible indicators 314, 316, respectively.

Upon releasing the emergency switch 111 (e.g., transmitter button), signal "D" at the position 404 goes high and signal "B" at position 408 toggles. Whenever the signal "B" goes high, the buzzer (e.g., alarm 316 shown in FIG. 3) is activated. The signal "B" may be reset to a low state by depressing the reset button 318.

Signal "C" at a position 410 is in a high state whenever the signal "B" is in a high state for more than a predetermined period of time (e.g., 30 seconds) and there has been no intervening reset by the user. Whenever the signal "C" is high, an alarm is triggered to the communications device 106 (e.g., satellite modem or auto-dialer). If the user determines to cancel the alarm, an attempt may be made to reset the request. However, there may be no guarantee that the reset of the alarm may be successful.

FIG. 4B shows the timing diagram for the control device and illustrates low and high states of signals A, B, C, D, and E described above with respect to FIG. 4a. At a position X identified in the timing diagram, no alarm sounds because the signal "B" was toggled by the receiver contact by the user before elapse of a predetermined time period (e.g., 30 seconds). No alarm sounds at a position Y in the timing diagram as a reset had occurred before the predetermined time period had elapsed.

FIG. 4C is an exemplary circuit schematic of the control device 1104 in accordance with another embodiment of the invention wherein reference numerals like those shown in FIG. 3 and FIG. 4C are shown using similar reference numerals but with a prefix "1" added. The schematic 1104 includes a voltage regulator circuit 1418 for regulating an input voltage. For example, the regulator circuit 1418 may be configured to regulate an input voltage of +12 V to produce an output voltage of +5 V by appropriately configuring resistors and capacitors used in the regulator circuit 1418. In one case, resistors R1 and R2 having a resistance of 100 ohms, capacitor C2 having a capacitance value of 0.1 micro farads, and capacitor C3 having a capacitance value of 100 micro farads are used. The component values and the circuit configuration provided herein is merely exemplary. Other resistance and capacitance values may be used to regulate the input voltage to produce a different output voltage. Likewise, various other circuit schematics of the control device 104 are possible.

The circuit 1104 also comprises other semiconductor components, such as, for example hex-inverting Schmitt trigger device 502. An exemplary device 502 may be of the type 74HC14 obtained from Phillips Semiconductors, and such devices are capable of transforming slowly changing input signals into sharply defined, jitter-free output signals. Other components of the circuit 1104 include devices 1420 and 1422 that correspond to the D-type flip-flops 420 and 422 shown in FIG. 4A. For example, devices 1420 and 1422 may be of the type 74HC74 obtained from Phillips Semiconductors.

The status of signals A, B, C, D, and E earlier described with reference to FIGS. 4A and 4B are identified using similar nomenclature in the circuit schematic 1104 of FIG. 4C. For example, the status of signal A described at position 406 in FIG. 4A would be the same at position 1406 identified in the circuit 1104, the status of signal B at position 408 would be the same at position 1408, and so on. The complement of a signal is indicated by a "dash" over the letter. For example, the complement of signal "A" is represented as "$\overline{A}$". Connectors J1–J6 provide input and output connections to and from the circuit 1104. Visual indicator 1314 provides visual indication, and audible device or siren 1316 provide audible indication to attract attention of a third party.

Figure 4G:
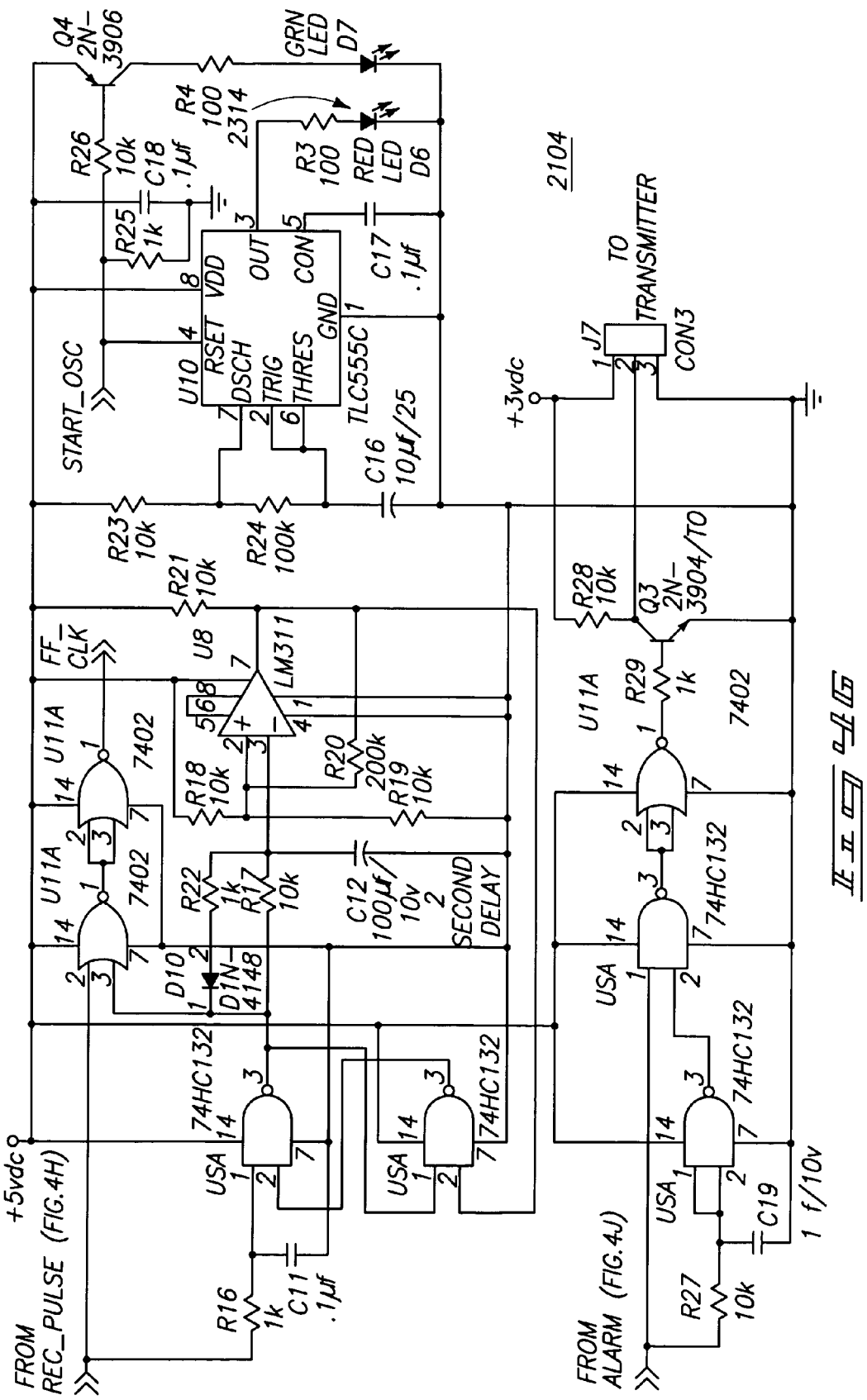

FIGS. 4F and 4G are exemplary circuit schematics of the control device 2104 in accordance with another embodiment of the invention wherein reference numerals like those shown in FIG. 3, FIGS. 4a, and 4c are shown using similar reference numerals but with a prefix "2" added. The control device 2104 includes a bridge rectifier 2419 in order to facilitate reverse polarity of input power and also prevent short circuiting circuit board of the control device 2104 in the event that the control device 2104 is improperly installed. Also, the embodiment shown in FIG. 4G is configured to have a two second delay between a first time activation and the second time activation of the transmitter (e.g., transmitter 202 of FIG. 2). This feature enables the receiver 104 (e.g., fox paws receiver 104 (FIG. 1)) to recognize only the first transmission of the transmitter 202 and ignore the transmissions received within two seconds from the receipt of the first transmission. The visual indicator 2314 is configured to include blinking light emitting diodes (e.g., RED LEDs) in order to provide enhanced visual indication.

FIG. 5 is a schematic illustrating activation of the emergency shutoff system, as shown in FIG. 1, by a user of a power machine during an emergency situation. In the depicted case, a tractor operator has fallen from the tractor and is injured. In another case, the operator may catch an arm in an implement such as a hay bailer pulled by the tractor. The methodology and the steps involved in the activation of the emergency shutoff system are set forth below at FIG. 8.

In another embodiment, the GPS device 108 used with the control device 104 (e.g., fox paws receiver) may be modified to be used in recreational areas that include camping, hiking, hunting, fishing, rock climbing, snow skiing, etc. The GPS device 108 may be configured to include a controller of the type similar to the control device 104. A wireless transmitter device of the type similar to the wireless device 110 may be carried by a user. The controller and the GPS device 108 may be configured for inclusion in a backpack carried by the user. The communication range between the wireless device carried by the user and the backpack having the GPS unit 108 and the controller may be in the range of, for example, 1200 feet. The GPS unit 108 with the controller may be used to assist a user in need in different situations.

For example, a mountain climber may place the backpack having the GPS unit 108 and the controller at the base of the mountain and carry the wireless device 110 on the user's person. In the event of an emergency, the user may depress the emergency switch (e.g., switch 111) of the wireless device, thereby activating the GPS unit 108 and the alarm of the controller to summon rescue personnel to the user's aid. The precise location of the user may be determined from the coordinates provided by the GPS unit 108. Once the backpack is located, the user may be easily located as the user is generally situated within a few hundred feet from the location of the backpack having the GPS unit 108.

Other examples include rescuing motorists who have fallen off the road into a ravine or a valley alongside the road by locating the GPS and the controller carried by the motorist using a signal that is activated by the motorist using the wireless device carried on the motorist's person. Likewise, a soldier's location may be determined when the soldier gets separated from his squadron. The GPS unit 108 with the controller may also be used to send out the location of the victim by activating the GPS unit 108 and sending an alarm to rescue personnel. The activation of the GPS unit 108 and the alarm being performed using the wireless device carried by the victim. In yet another example, the GPS unit with the controller may be used to set up an imaginary fence around a certain geographic area, and the controller may be configured to activate the GPS unit and an alarm if it is removed from the geographic area. In a further example, the GPS unit with the controller may be placed in an automobile of an Alzheimer patient. In the event the patient moves from a predetermined geographic area, the control device is activated to send an alarm and the GPS unit 108 may be activated to determine the patient's location.

FIG. 6 is a high-level schematic of an emergency shutoff system 600 in accordance with other embodiments of the invention wherein elements like those illustrated in FIG. 1 are shown using similar reference numerals. The system 600 includes a power machine 102 (e.g., assembly plant), a control device 104, a communications device 106, a global positioning system (GPS) 108, and a wireless device 110. Such elements have been described in detail with reference to FIGS. 1–3 and therefore the description will not be repeated.

The machine 102 may be in the form of an assembly plant where a number of users are employed. Each of the users may be provided with the wireless device 110 such that any one of the wireless devices 110 may be used to shut down the operation of the machine 102. Thus, multiple wireless devices 110 may be configured to control a single control device 104 (e.g., fox paws receiver). Alternatively, in other embodiments, a single wireless device (e.g., wireless device 110) may be used to control individual ones of a plurality of control devices 104.

It will be appreciated that if the machine 102 is in the form of an assembly plant (e.g., fixed machinery), the communications device 106 may be in the form of a land-line and a designated physical address corresponding to the phone number may be readily determined by rescue personnel in the event of an emergency. Therefore, the GPS 108 to determine a location of the machine 102 may not be necessary.

On the other hand, if the machine 102 is a mobile machine (e.g., tractor or other agricultural machine), in such an embodiment, the control device 104 activates the GPS 108 to identify a geographical location of the machine 102.

The GPS 108 may provide the position information of the machine 102 to a satellite 601. Such position information is downloaded by the satellite 601 to a satellite down link 602 and to a data retrieval computer system 604 that is configured to identify geographic location of the machine 102 based on the information provided received from the satellite 601. The communications device 106 is configured to transmit audio information to the call center 606.

Alternatively, in another embodiment of the invention, information from the GPS 108 also includes a serial number of a global positioning system that is unique to the GPS 108. Such serial number information may be compared with information that is stored in the data retrieval computer 604 to identify a list of pre-stored telephone numbers provided by the user. The call center 606 calls such telephone numbers in a predetermined order. If a called party of such telephone numbers cannot be reached, the call center 606 contacts emergency personnel at an emergency reception center 608. The list of predetermined telephone numbers may be stored in a memory (e.g., such as memory 310) or a storage device (e.g., such as the storage device 312).

In other embodiments, the location information determined by the data retrieval computer system 604 together with the audio information may be received by the call center 606 and forwarded to the emergency (e.g., 911) reception center 608. The emergency reception center 608 dispatches rescue personnel to the location of the machine 102 using information provided by the call center 606.

FIG. 7 illustrates an emergency shutoff system 700 in accordance with some other embodiments of the invention wherein elements like those illustrated with reference to FIG. 1 are depicted using similar reference numerals. The system 700 includes a control device 104, a wireless device 110 carried by a user, a power-relay or magnetic contacter 702 having a relay 703, and a plurality of individual magnetic starters 704, 706, 708, respectively, and machines 710 associated with respective magnetic starters 704, 706, and 708. For example, in one case a power-relay may be used instead of the magnetic contacter 702 as power-relays are available for a reduced cost relative to the magnetic contacter 702. Exemplary machines 710 comprise farm seeding machines, augers, conveyors, mixers, grinders, drag chain machines, blenders, welders, presses, lathes, or other agricultural machinery. Machines 710 that are of other types are possible, and therefore the inventive concept is not deemed to be limited to a specific machine type.

In the embodiment of FIG. 7, a single control device 104 may be used to control a plurality of machines 710. A few of the machines are illustrated for simplicity in explaining the inventive concept. It will be appreciated that more or less number of machines than what has been illustrated are possible.

The control device 104 and the wireless device 110 have been described above with reference to FIG. 1. The control device 104 is connected to the magnetic contacter 702. Upon receiving a signal from the wireless device 110 carried by a user, the control device 104 operates to energize the relay 703 in order to turn OFF the magnetic contacter 702 by causing output leads (not shown) to be electrically discontinuous, thereby disabling power supplied to magnetic starters 704, 706, and 708, that draw electrical power via the magnetic contacter 702, therefore shutting off respective machines 710. Thus, a single wireless device 110 may be used to control operation of a plurality of machines.

FIG. 8 is a flowchart describing a methodology of shutting down operation of a power machine using the control device 104 and the wireless device 110 according to some embodiments of the invention.

The methodology begins if the user of a machine is injured or encounters a threat of injury due to the operation of the machine 102. At a step 802, the user presses the emergency switch 111 of the wireless device 110 that is carried by the user. The wireless device is configured to transmit a signal to the control device to perform one or more of a plurality of external functions by transmitting a signal in a predetermined sequence of operations. After the emergency switch 111 is activated, the communications device 106 and the GPS 108 are activated at the same time. Other activated sequences are possible. The process then proceeds to step 804.

At a step 804, an inquiry is made to determine whether or not the emergency encountered by the user is a real emergency and that the user is injured, or the user was able to avert the injury. If the emergency situation encountered by the user is determined to be real, step 806 is performed. The process proceeds to step 808 if the user of the machine 102 senses no emergency.

At a step 806, the processing circuitry 308 of the control device 104 calls a predetermined list of telephone numbers. In one embodiment, the telephone number may be stored in the memory 310 or the storage device 312 of the control device, in a predetermined order of priority. The telephone numbers may also be stored in the call center 606. The process then proceeds to step 810.

At a step 810, an inquiry is made to determine if any of the calls made at step 806 are answered by a called party. If the call is not answered, step 814 is performed.

At a step 814, a distress call to emergency (e.g., 911) is initiated and GPS coordinates are given to emergency personnel. The process then proceeds to step 816.

At a step 816, rescue personnel are summoned to the user.

If the call is answered at step 810, step 812 is performed.

At a step 812, the processing circuitry 308 retrieves a predetermined audio message and transmits the retrieved audio message to the called party who may in turn summon rescue personnel to assist the user, as needed. Alternatively, the processing circuitry 308 may establish communication between the user of the machine 102 and the called party. Such may be accomplished by identifying a serial number of the communications device 106 or the GPS 108 at the call center 606 and correlating the serial number information with a predetermined list of phone numbers that are stored in the call center. An attendant at the call center 606 may call the list of predetermined phone numbers in the order specified. If none of the called parties answer, then the attendant may call 911. In other embodiments where the user is also carrying a microphone on him, then the user may directly communicate with the called party.

At a step 808, the user of the machine 102 presses (e.g., activates) the switch 111 a second time after a predetermined time period subsequent to initial activation of the switch to shutdown the machine 102. The second time activation of the switch 111 is performed to interrupt the previously initiated distress call to the rescue personnel and the activation of the GPS device. Once the user is able to clear himself or herself from the machine 102, the user starts operation of the machine by resetting the control device 104 by way of the reset switch 318. If the user perceives that he or she is still in danger, the process proceeds to step 818.

At a step 818, an inquiry is made to determine whether or not the emergency switch 111 should be reactivated. If yes, the process proceeds to step 806. Otherwise, the process ends.

Thus, there has been shown an emergency shutdown arrangement for a power machine (e.g., agricultural machinery, assembly plants) that permits a user of the machine not only to remotely shutdown operation of the machine but also automatically summon rescue personnel to assist the user by initiating a call to the rescue personnel while also providing position information of the user. Further, the system described above in accordance with various embodiments enables the user to control various external functions using a single button provided on the wireless device carried by the user. Furthermore, the emergency shutdown system according to various aspects of the invention may be detachably mounted to a variety of equipment, thereby not only providing an ability to control operation of various machinery in a cost effective manner, but also protecting the lives of users operating at remote locations.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An emergency shutoff system for power machinery, comprising:
    a control device housing a transmitter circuit, a receiver circuit, and a processor, the control device configured to be detachably mounted to the power machinery to control an operation thereof;
    a wireless device carried by a user and configured to transmit information to the control device, the information including control signals to cause the processor to shut down operation of the power machinery, the control device being configured to transmit a distress signal to a third party located remote from the power machinery, and provide an indication to attract attention of others, wherein transmission of the distress signal is initiated after receiving the control signals to shut down the power machinery;
    a communications device communicatively coupled to the control device to transmit the distress signal to the third party; and
    wherein the control device is configured to operate in a plurality of different modes, individual ones of the plurality of different modes being configured to perform a distinct function, and wherein selective operation of a single emergency switch provided on the wireless device is configured to cause the control device to operate in the plurality of different modes including disabling operation of the power machinery and preventing a third party from inadvertently initiating operation of the power machinery from a remote location, the disabling of the power machinery triggers the communications device to transmit the distress signal to the third party.

2. The system of claim 1, further comprising:
    a visual indicator and an audible device, both being configured to be mounted to the power machinery and activated by the user by pressing the emergency switch to cause the power machinery to shut down and to provide a visual and audible indication of the user's location.

3. The system of claim 2, wherein the visual indicator comprises a strobe light, a flashing light, and the audible device comprises a siren.

4. The system of claim 1, wherein the communications device comprises one of a cellular communications device or a landline communications device.

5. The system of claim 1, wherein the wireless device is further configured to transmit a signal to the control device to perform one or more of a plurality of external functions by transmitting a signal in a predetermined sequence of operations.

6. The system of claim 1, further comprising a global positioning system (GPS) communicatively coupled to the control device, and the GPS is configured to be activated using the wireless device.

7. The system of claim 6, wherein the distress signal activates the GPS to determine the geographic location of the power machinery, the geographic location being used to dispatch rescue personnel to assist the user.

8. The system of claim 6, wherein both the GPS and the communications device are automatically activated by the processor if the user causes the power machinery to be shut down, and the geographic location information determined by the GPS is used to identify a general location of the power machinery, and the audible and visible information is used to pinpoint the location of the power machinery once the general location is determined.

9. The system of claim 1, wherein the control device is configured to operate in a predetermined mode among the plurality of different modes after the emergency switch is pressed by the user a predetermined number of times during a predetermined time period.

10. The system of claim 1, wherein the wireless device is configured to interrupt transmission of a previously initiated distress signal from the control device by operating the emergency switch for a predetermined time period, and wherein the wireless device is further configured to reinitiate the interrupted transmission upon receiving a request from a user of the power machinery.

11. The system of claim 1, wherein the power machinery comprises mobile machinery, or fixed machinery.

12. The system of claim 11, wherein the mobile machinery comprises mobile machinery used in agriculture including harvesting and seeding machines.

13. The system of claim 11, wherein the fixed machinery comprises an assembly plant.

14. The system of claim 1, wherein the control device is configured to trigger operation of a latch relay coil of the power machinery thereby disabling electrical circuit conductivity for at least an injector pump or an energy latch relay coil configured to control operation of the power machinery.

15. The system of claim 1, wherein the control device further comprises:
   a communications interface configured to communicate with external devices;
   a memory configured to store user programmed information; and
   a storage device configured to store user-related information including a plurality of sets of audio recorded information, wherein the processor is configured to control the communications interface, the memory, and the storage device.

16. The system of claim 15, wherein, after receiving an interrupt signal from the user, the processor is configured to interrupt activation of the GPS and the distress signal and instead is configured to dial a list of telephone numbers stored in the memory, the telephone numbers being dialed in a predetermined order until a response is received by the user from a called party.

17. The system of claim 16, wherein if a response is received after dialing a telephone number from the list, a first set of audio information is retrieved from the storage device and communicated by the processor to the called party.

18. The system of claim 16, wherein the processor is configured to reinitiate transmission of the distress signal if no response is received by the user after dialing all the telephone numbers from the list.

19. The system of claim 18, wherein the reinitiated transmission of the distress signal is directed to the rescue personnel and comprises a second set of audio information that is retrieved from the storage device and communicated to the rescue personnel.

20. The system of claim 1, wherein the control device is configured to operate using alternate and direct current voltages.

21. An emergency shutoff system for an assembly plant, comprising:
   a control device configured to be detachably mounted to the assembly plant to control an operation of the assembly plant;
   a plurality of wireless devices, individual ones of the wireless devices adapted to be carried by a user and configured to transmit control information to the control device to shut off operation of the assembly plant and selectively perform one or more functions including (i) transmitting a distress signal to a third party located remote from the assembly plant, the transmission of the distress signal being initiated after receiving the control information to shut off the assembly plant, (ii) provide an indication to attract attention of others;
   a communications device communicatively coupled to the control device to transmit the distress signal; and
   wherein the control device is configured to operate in a plurality of different modes, and wherein a single emergency switch provided on individual ones of the wireless devices is configured to enable the control device to be operated in the plurality of different modes including disabling operation of the assembly plant to prevent a third party from inadvertently initiating operation of the assembly plant from a remote location.

22. The system of claim 21, wherein individual ones of the plurality of wireless devices are configured to communicate with the control device to shut off operation of the assembly plant.

23. The system of claim 21, further comprising:
   a visual indicator and an audible device, both being configured to be mounted to the assembly plant and activated by the user by operating the emergency button to provide a visual and audible indication of the user's location.

24. The system of claim 23, wherein the visual indicator comprises a strobe light, a flashing light, and the audible device comprises an audible alarm.

25. The system of claim 21, wherein the communications device comprises one of a cellular communications device or a landline communications device.

26. The system of claim 21, wherein the wireless device is further configured to transmit a signal to the control device to perform one or more of a plurality of external functions by transmitting a signal in a predetermined sequence of operations.

27. The system of claim 21, wherein the control device is configured to operate in a predetermined mode among the plurality of different modes after the emergency switch of at least one of the wireless devices is pressed by the user a predetermined number of times during a predetermined time period.

28. The system of claim 21, wherein the individual wireless devices are configured to interrupt transmission of a previously initiated distress signal from the control device by pressing the emergency switch for a predetermined time period, and wherein the individual wireless devices are further configured to reinitiate the interrupted transmission upon receiving a request from respective users of the assembly plant.

29. The system of claim 21, wherein the control device further comprises:
   a communications interface configured to communicate with external devices;
   a memory configured store user programmed information; and
   a storage device configured to store user-related information including a plurality of sets of audio recorded information, wherein the processor is configured to control the communications interface, the memory, and the storage device.

30. An emergency shutoff system for controlling a plurality of power machinery, comprising:
   a power controller having a relay switch configured to operate in a first and second positions, the first position establishing contact with a power supply and the second position disabling the contact with the power supply, the power controller configured to supply power to the plurality of power machinery;
   a control device configured to be detachably mounted to the power controller;
   a wireless device carried by a user and configured to transmit control information to the control device to shut down operation of the plurality of power machinery by causing the relay switch to move from the first position to the second position, the control device being configured to selectively perform one or more functions including (i) transmitting a distress signal to a third party, (ii) provide an indication to attract attention of others;
a communications device communicatively coupled to the control device to transmit the distress signal; and
wherein selective operation of a single emergency switch provided on the wireless device enables the control device to perform a plurality of external functions including preventing a third party from inadvertently initiating operation of the plurality of power machinery from a remote location.

31. The system of claim 30, further comprising:
a visual indicator and an audible device to provide a visual and audible indication of an emergency situation to a third party when the relay switch is caused to move from the first position to the second position.

32. The system of claim 31, wherein the visual indicator comprises a strobe light, a flashing light, and the audible device comprises an audible alarm.

33. The system of claim 30, wherein the communications device comprises one of a cellular communications device or a landline communications device.

34. The system of claim 30, wherein the wireless device is further configured to transmit a signal to the control device to perform a distinct external function among the plurality of external functions by transmitting a signal in a predetermined sequence of operations within a predetermined time period.

35. A system configured to perform emergency shut down of an agricultural machine and contact rescue personnel, the system comprising:
a control device housing a transmitter circuit, a receiver circuit, and a processor, the control device configured to be detachably mounted to the agricultural machine to shut off operation of the machine, the control device including:
a processor;
a communications interface configured to communicate with external devices;
a memory configured store user programmed information; and
a storage device configured to store user related information including a predetermined list of telephone numbers to which distress calls are selectively initiated by the user, and a plurality of sets of audio recorded information;
a visual and audible device provided on the agricultural machine and communicatively coupled to the control device, the control device configured to initiate operation of the visual and audible devices;
a wireless remote controller carried by a user and configured to transmit control signals to the control device, the receiver circuit of the control device configured to receive the control signals, the control signals are provided to the processor to shut down operation of the agricultural machinery, the transmitter circuit of the control device is configured to transmit a distress signal to a third party located remote from the agricultural machinery while activating operation of the visual and audible devices;
a communications device communicatively coupled to the control device to transmit the distress signal to the third party; and
wherein the control device is configured to operate in a plurality of different modes, individual ones of the plurality of different modes being configured to perform a distinct function, and wherein a single switch provided on the wireless remote controller is configured to initiate the plurality of different modes of operation of the control device including an ability to disable operation of the agricultural machine and prevent a third party from inadvertently initiating operation of the agricultural machine from a remote location, and the wireless remote controller is configured to interrupt transmission of a previously initiated distress signal from the control device by pressing the single switch for a predetermined time period within a predetermined time period after transmitting the distress signal.

36. The system of claim 35, wherein the visual indicator comprises a strobe light, a flashing light, and the audible device comprises an audible alarm.

37. The system of claim 35, wherein the communications device comprises one of a cellular communications device, satellite communications device, or a landline communications device.

38. An emergency shutoff system for power machinery, comprising:
a controller configured to disable a power supply for power machinery;
a wireless device supported by a user and configured to transmit control information to the controller to shut down operation of the power machinery, the controller further configured to selectively perform one or more functions including (i) transmitting a distress signal to a third party, (ii) providing an indication to attract attention of the third party; and
a communications device communicatively coupled to the controller to transmit the distress signal,
wherein the wireless device includes a single emergency switch, selective operation of the single emergency switch enables the controller to perform a plurality of external functions including preventing the third party from inadvertently initiating operation of the power machinery from a remote location.

39. The system of claim 38, further comprising:
a visual indicator and an audible device to provide a visual and audible indication of an emergency situation, experienced by a user of the power machinery, to the third party.

40. The system of claim 39, wherein the visual indicator comprises a blinking light, strobe light, a flashing light, and the audible device comprises an audible alarm.

41. The system of claim 38, wherein the communications device comprises one of a cellular communications device, a satellite communications device, or a landline communications device.

42. The system of claim 38, wherein the wireless device is further configured to transmit a signal to the controller to perform a distinct external function among the plurality of external functions by transmitting a signal in a predetermined sequence of operations within a predetermined time period.

43. The system of claim 38, wherein the controller comprises a bridge rectifier to enable reverse polarity of input power to the controller.

44. The system of claim 38, wherein the controller is configured to have a two second delay between a first activation of the emergency switch and a second activation of the emergency switch by a user carrying the wireless device.

45. An emergency shutoff method for power machinery, comprising:

detachably mounting a control device to the power machinery to control the power machinery, the control device including a transmitter circuit, a receiver circuit, and a processor;

transmitting information from a wireless device, carried by a user, to the control device to cause the processor to shut off operation of the power machinery;

after receiving an indication of the shut off of the power machinery, transmitting a distress signal to a third party located remote from the power machinery;

providing an indication to attract attention of others by activating visual and audible devices provided on the power machinery; and selectively operating an emergency switch provided on the wireless device to cause the control device to perform distinct ones of a plurality of external functions including an ability to disable operation of the power machinery and prevent a third party from inadvertently initiating operation of the power machinery from a remote location.

46. The method of claim 45, wherein activating the visual and audible devices comprises activating a strobe light and a siren.

47. The method of claim 45, wherein transmitting the distress signal comprises transmitting the distress signal via one of a cellular communications device or a landline communications device.

* * * * *